United States Patent [19]

Roberts

[11] Patent Number: 4,822,283
[45] Date of Patent: Apr. 18, 1989

[54] SEMANTIC MAPPING DEVICE FOR TEACHING LANGUAGE SKILLS

[76] Inventor: Lois M. Roberts, W 1952 Roosevelt Rd., Oconomowoc, Wis. 53066

[21] Appl. No.: 153,421

[22] Filed: Feb. 8, 1988

[51] Int. Cl.⁴ ............................................. G09B 19/00
[52] U.S. Cl. .................................... 434/171; 434/168; 434/170; 434/172
[58] Field of Search ............... 434/156, 167, 168, 170, 434/171, 172, 406, 413; 446/92

[56] References Cited

U.S. PATENT DOCUMENTS 2,570,625  10/1951  Zimmerman et al. ............... 446/92
4,478,582  10/1984  Tucker ................................ 434/170

FOREIGN PATENT DOCUMENTS 197801  1/1978  France ................................. 434/171

Primary Examiner—Maryann Lastova
Assistant Examiner—Valerie Szczepank
Attorney, Agent, or Firm—Bayard H. Michael

[57] ABSTRACT

Progressively smaller pieces can be connected to the largest piece to aid in semantic mapping of an informative passage, for example. Legends can be applied to the pieces (and can be wiped off later). The pieces can be connected mechanically or magnetically. The mechanical connections can be different shapes to limit connection of a piece to the next larger piece. Similarly, the pieces can be magnetized to achieve the same end. The perimeter of each piece can be color coded to indicate the color of the proper piece to be connected to the perimeter.

4 Claims, 1 Drawing Sheet

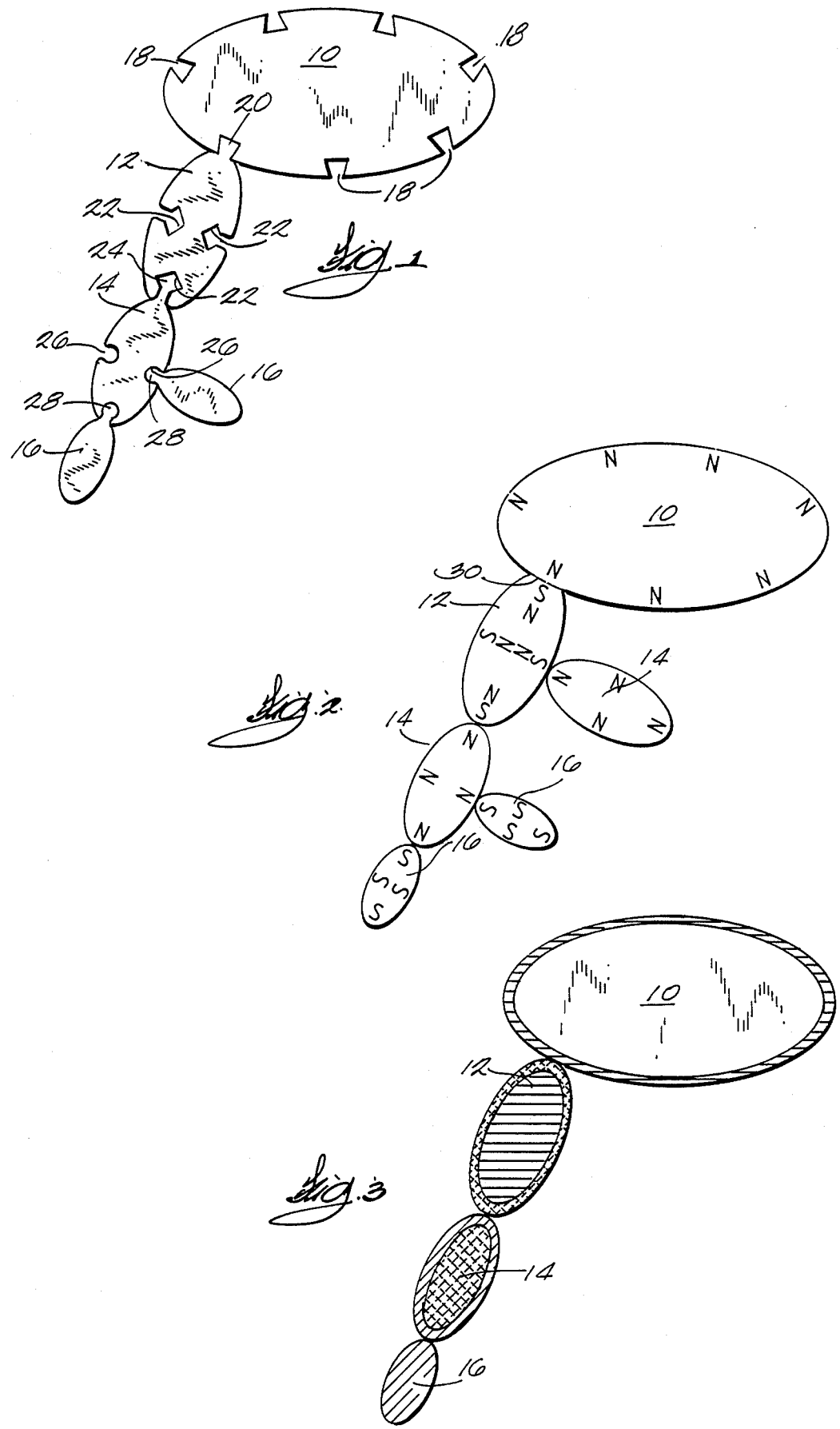

SEMANTIC MAPPING DEVICE FOR TEACHING LANGUAGE SKILLS

BACKGROUND OF THE INVENTION

The present invention is an educational aid that can be utilized in teaching reading comprehension skills. Many readers may benefit from the use of this invention; however, it will be particularly useful for the reader whose nonverbal thinking style is enhanced by visual spatial strategies for mental organization.

Current professional literature embraces a refocusing of the goal of reading instruction from an emphasis on the mechanical translation of the written code to teaching reading as an active search for meaning. In this search for meaning, assessment of existing knowledge becomes critical to understanding. The process of integrating prior knowledge with new text information to create a new level of comprehension is central to the task of teaching reading.

To maximize reading comprehension, teachers need to find ways to help students activate and retrieve prior knowledge related to the topic about which they will be reading. Further, teaching strategies need to be utilized that will enable the reader to comprehend relationships between words and/or concepts. Educational research has documented that semantic mapping is an instructional strategy that has positive effects on improving reading comprehension relative to the integration of prior knowledge and the development of concept relationships.

Semantic mapping is a categorical structuring of information in graphic form. Readers can visualize how words and/or concepts are related. Several other synonymous labels such as semantic webbing, semantic networking, cognitive mapping, or plot maps have been used to refer to this instructional strategy. Presently, instructors or students create semantic maps as visual diagrams drawn on paper or on the chalkboard. The design and structure of semantic maps may have as many variations as the number of persons using them or may be dependent on the complexity of the text to be comprehended.

Some commonly used applications of the semantic mapping strategy are for general vocabulary development, for pre and post reading and for organizing content area concepts or nonfictional information. Some innovative uses of semantic mapping include syllibication, number and letter sequencing, visual discrimination of pictures or letters, recognition of math operations relationships and building story sequences. In all of these uses of semantic mapping, some kind of a relationship is being recognized between sets of information.

One object of this invention is the provision of a reading comprehension aid for the visual learner.

Another object is to provide an educational aid that involves a tactile/kinesthetic dimension when showing relationships of printed information.

Another purpose of this invention is to provide for a concrete level (rather than a paper and pencil task) of organizing concepts.

A still further aim of this teaching device is to provide a basic semantic mapping framework which is reusable and therefore allows for any concept relationships to be demonstrated.

With this invention four levels of descending relationships can be written on a semantic may which consists of movable pieces of decreasing size and/or different colors. First, the main idea or key concept is written on the largest central piece which is preferably an oval shape, for example, but is always the same shape. From this focal point, secondary categories of related vocabulary or information are written on smaller pieces having similar or different shape and connected to the main idea piece. Details related to the secondary categories are written on the third smaller size and connected to secondary categories. Lastly, sub-details can be written on the smallest size of the four pieces and connected to details. The pieces can be magnetized to reject improper connection in the pieces four different levels of related information. The structure of the semantic map may vary according to the reader's understanding of how to organize concepts.

SUMMARY OF THE INVENTION

This invention provides a multiplicity of pieces of different sizes and having means for connecting the pieces together with the largest piece having the second largest piece connected to it while having the third largest piece connected to the second largest piece, etc.

The invention provides connecting means which effectively rejects improper connection of pieces of different sizes. The connecting means can be magnetic or mechanical using different shapes to limit the connections to proper size relationships.

The surface of a piece is treated to accept writing (by grease pencil or eraseable marking pen, for example) which is easily removed (wiped off). Surfaces can be colored if desired.

Finally, the perimeter of each piece can be colored to indicate the dominant color of the next smaller piece which is the proper piece to be connected to the perimeter.

A major advantage of this educational aid is the presence of the manipulative visual and spatial dimension which is significant for imprinting in the nonverbal thinking style reader. Retention for this type of reader is greatly enhanced by a visual image for the whole and its related parts.

Readers who experience difficulty sorting out main idea and sub-ideas in printed text, can use this invention as a manipulative aid that precedes instruction in outlining or note taking. Thus, another advantage of this invention is the potential for being able to change the organization of related vocabulary or concepts without excessive erasiing. For the deficient learner frequent erasing, which is often inherent in a paper and pencil task, is decreased.

A third advantage of this teaching aid is the limitation of space for writing key concepts. Disabled readers often have a tendency to extract entire sentences to record key concepts. By limiting the writing space, the reader will be reminded that key words must be selected to represent main ideas.

Physical qualities such as size, shape and color are significant when mental images need to be created to aid retention. Four decreasing sizes have been utilized in this invention in correlation with the descending levels of related information on a semantic map. Each level can also be represented by a different color. One side of the manipulative pieces is white while the other side is in color. If the reader needs color for added discrimination of categories, then the colored side of each level could be used. If the information in only one level needs to be emphasized, then the color of that level could be used with the remaining pieces being on the white side. With this teaching aid, color is a completely flexible variable.

BRIEF DESCRIPTION OF THE DRAWINGS

FIG. 1 is a plan view of one set of pieces incorporating the present invention. This set has provision for mechanical linkage of the pieces.

FIG. 2 is a plan view of another set of pieces according to this invention. This set is provided with magnetic poles on the perimeter constraining the user to connect the pieces in the proper size sequence.

FIG. 3 is still another set is which the perimeter of each of the pieces is provided with a color code indicating the dominant (central) color of the piece to be connected to it.

DETAILED DESCRIPTION OF THE DRAWINGS

Referring to the drawings in detail, the concept is to provide four different size pieces in each set. These pieces range from largest to large to small to smallest. In FIG. 1 the largest is designated by numeral 10, the large piece is 12, the small piece is 14 and the smallest piece is 16. When used for semantic mapping of an informative passage or the like, the broad idea of concept is written on the largest piece. Then a subconcept is written on the large piece 12. There may very well be a number of the subconcepts which are directly subservient to the largest piece and therefore a number of the large pieces may be connected to the largest. Similarly, a more refined or detailed idea is written on smaller piece 14 connected to the large piece 12. Finally, the further details would be written on pieces the size of piece 16 and they would be connected to the correct detail 14.

Properly done, breaking down an informative passage or the like, this helps the student whose nonverbal thinking style is enhanced by visual spatial strategies to help with mental organization of thoughts. The provision of special pieces by themselves is a very helpful concept since they may be manipulated and readily connected and disconnected. For example, if a fine detail on a piece 16 is connected to the wrong detail piece 14, it can be readily reconnected to a proper detail piece 14.

While the pieces are usable with a smooth perimeter and nothing else, there is some advantage in having them connect to each other, preferably in a way that the user is, in effect, forced to connect each pieces only to the next larger and/or the next smaller piece. Thus, the modification shown in FIG. 1 has means on the perimeter of each piece to aid the user in connecting each piece only to the next larger and/or the next smaller piece. It will be noted that the largest piece 10 has dovetail slots 18 around its perimeter and each of these may receive a dovetail projection 20 on the large piece 12 which is to be connected to the largest piece 10, thus interlocking the pieces. The large piece 12 perimeter is provided with diamond-shaped openings 22 which receive a diamond-shaped tongue 24 on the small piece 14 and the small piece 14, in turn, is provided with a plurality of keyholes 26 around the perimeter to receive the key configurations 28 on each smallest piece 16. Thus, the pieces progressively connect to each other and aid the user in correctly connecting the pieces and the level of idea or concept represented by the pieces. It will be noted, for example, that a number of large pieces 12 can be connected to the perimeter of the largest piece 10, that is, the broad idea piece 10 can receive or be host to a number of sub-concept ideas. Put another way, the broad idea 10 can have quite a few sub-concepts 12. And, each sub-concept can have a number of detail pieces connected thereto and on each detail piece there can be a number of sub-details 16 relative to the detail 14.

In the case of FIG. 2, the pieces would appear to the user to have a smooth exterior but they are magnetically polarized to accomplish much the same effect. Thus, the largest piece 10 is provided with north (N) poles on the perimeter; there are no south (S) poles on the perimeter. The piece 12 to be connected to it has not only a S pole, but also has a somewhat flattened portion 30 to rest against the perimeter of the largest piece 10. This results in a magnetic (N-S) connection as shown in FIG. 2 between the largest piece 10 and the large piece 12. The piece 12 has a number of south poles on its perimeter and requires a north pole to be connected thereto. This is done by providing the small piece 14 with a number of N poles around its perimeter, any one of which can be magnetically coupled to a S pole on the larger piece 12. Finally, the smallest piece 16 has S poles on its perimeter and these will be magnetically coupled to the N poles on the small piece 14. It will be appreciated the magnetic S perimeter on the smallest piece 16 does not prevent connecting it to the largest piece 10, but the size differential is so great that the user should readily appreciate the fact that it doesn't belong there. It will be appreciated that all of the pieces in FIG. 2 are made of magnetizable ceramic, for example, so that the magnetic pole structure can be applied thereto by known means with great speed.

Then we come to FIG. 3 which has no mechanical or magnetic coupling, but which has the perimeter of each piece color coded to indicate the color of the piece to be connected to it. Thus, the piece 10 has a blue perimeter. This means that the piece to be positioned next to it should have a blue center. Thus, the larger piece 12 has a blue center and is connected to the largest piece 10 which has a blue rim. The large piece 12 has an orange rim which means that the small piece 14 has an orange center to match the orange perimeter on the large piece 12. The smallest piece 16 is brown which matches the perimeter of the small piece 14. In this way, color can be utilized to help students best motivated by colors as opposed to something mechanical or magnetic. The magnetic and color concepts can be combined if desired or one side of each magnetized piece can be color coded while the other side is not. This gives the user a choice.

All of the pieces in the various modifications have a surface which can receive writing or the like. Thus, a special marking pen can be used to apply legends and then wiped clean after having served its use.

I claim:

1. A teaching aid comprising a plurality of sets of pieces of progressively smaller size ranging from largest to large to small to smallest,
   one piece being common to a plurality of sets and being the largest piece in each such set,
   each piece having a surface treated to accept legends which may be removed,
   each of said pieces including connecting means on the periphery thereof limiting connection of each such piece in each said set to being placed in contact only with a next larger or a next smaller piece whereby information is mapped semantically with the main idea or concept represented by said largest piece common to a plurality of sets and each progressively more detailed concept is represented by a progressively smaller piece in a set while other sets representing additional detailed concepts are connected to said common piece.

2. A teaching aid according to claim 1 in which said means comprises complimentary shapes on the perimeter of the pieces.

3. A teaching aid according to claim 1 in which said means comprises magnetic poles requiring poles of opposite polarity to be in contact.

4. A teaching aid according to claim 1 in which said means comprises a color on the perimeter of each piece indicative of the central color on the next smaller piece with the exception of the smallest piece which has no significant color on its perimeter.

* * * * *